Sept. 23, 1930.  J. GRIESINGER  1,776,356
BOOKMAKING MACHINE
Filed June 29, 1929   9 Sheets-Sheet 1

Inventor
John Griesinger
By
Attorney

Sept. 23, 1930.  J. GRIESINGER  1,776,356
BOOKMAKING MACHINE
Filed June 29, 1929  9 Sheets-Sheet 2
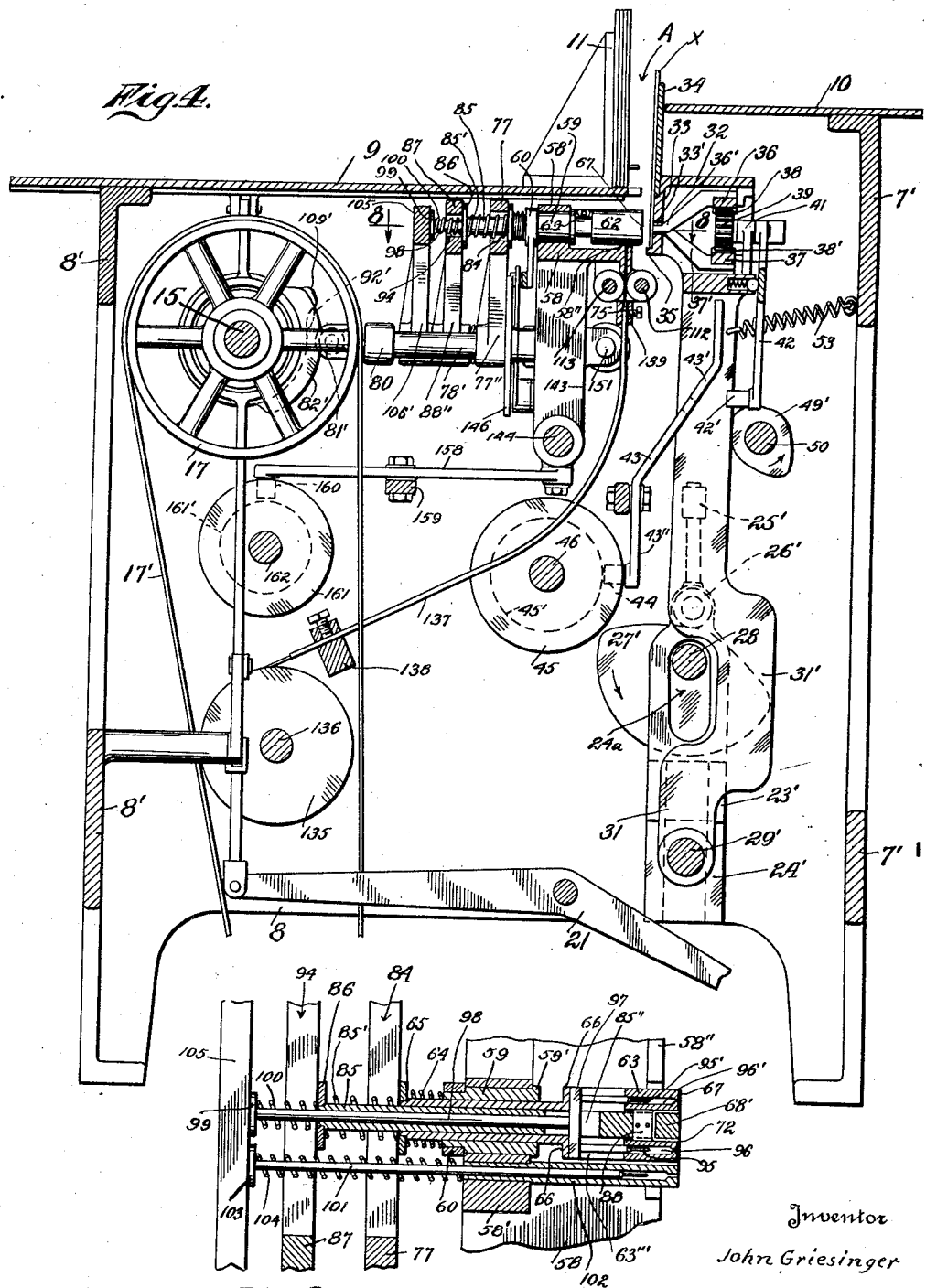
Inventor
John Griesinger Sept. 23, 1930.  J. GRIESINGER  1,776,356
BOOKMAKING MACHINE
Filed June 29, 1929  9 Sheets-Sheet 3
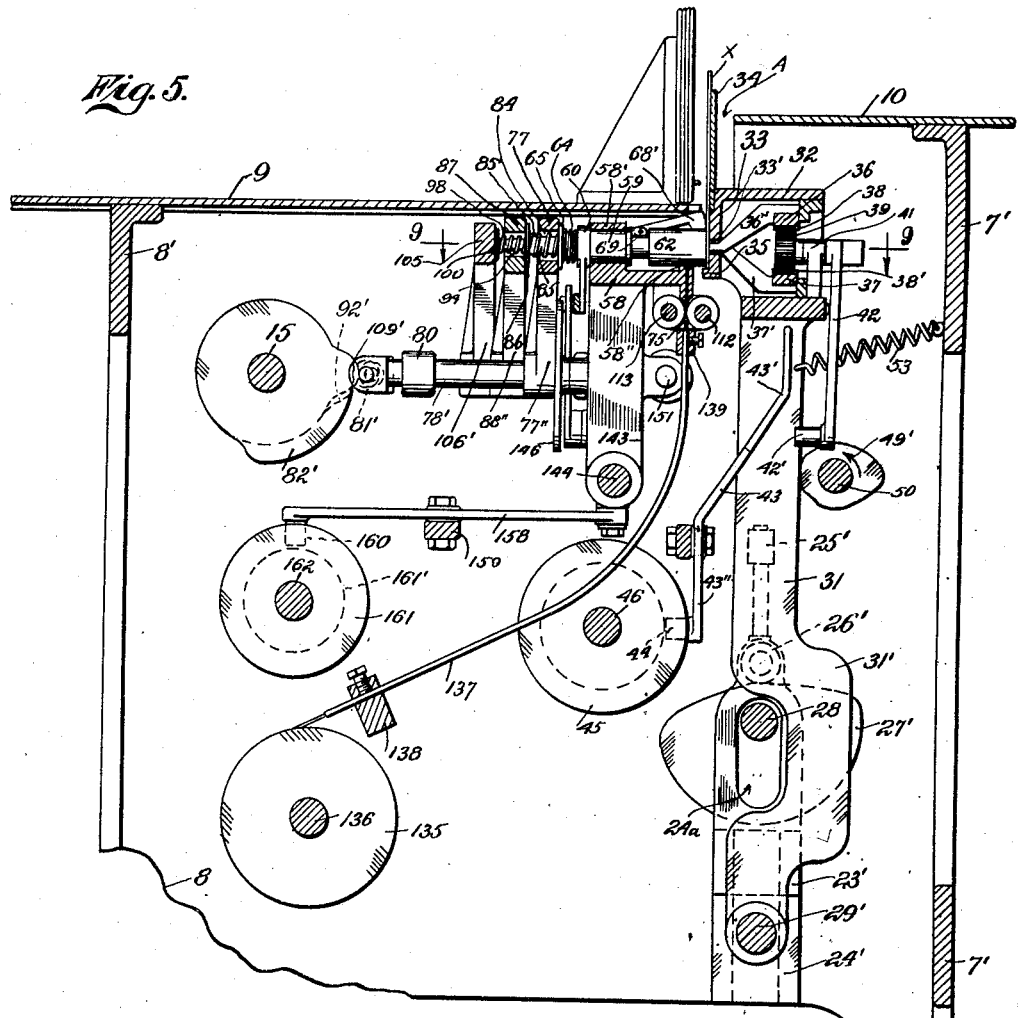
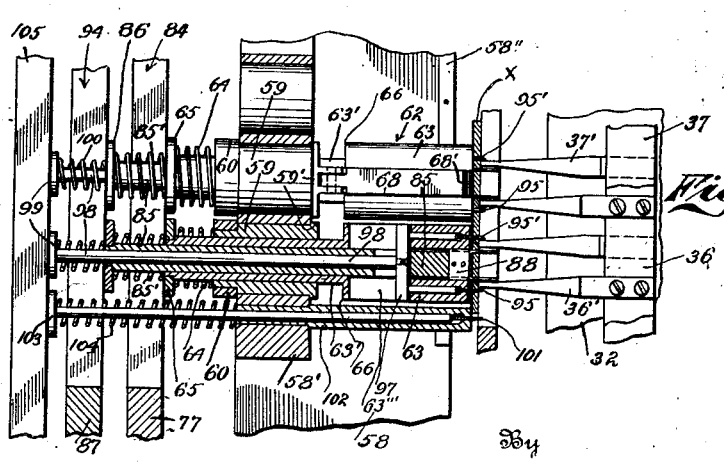
Inventor
John Griesinger Sept. 23, 1930.   J. GRIESINGER   1,776,356
BOOKMAKING MACHINE
Filed June 29, 1929   9 Sheets-Sheet 4
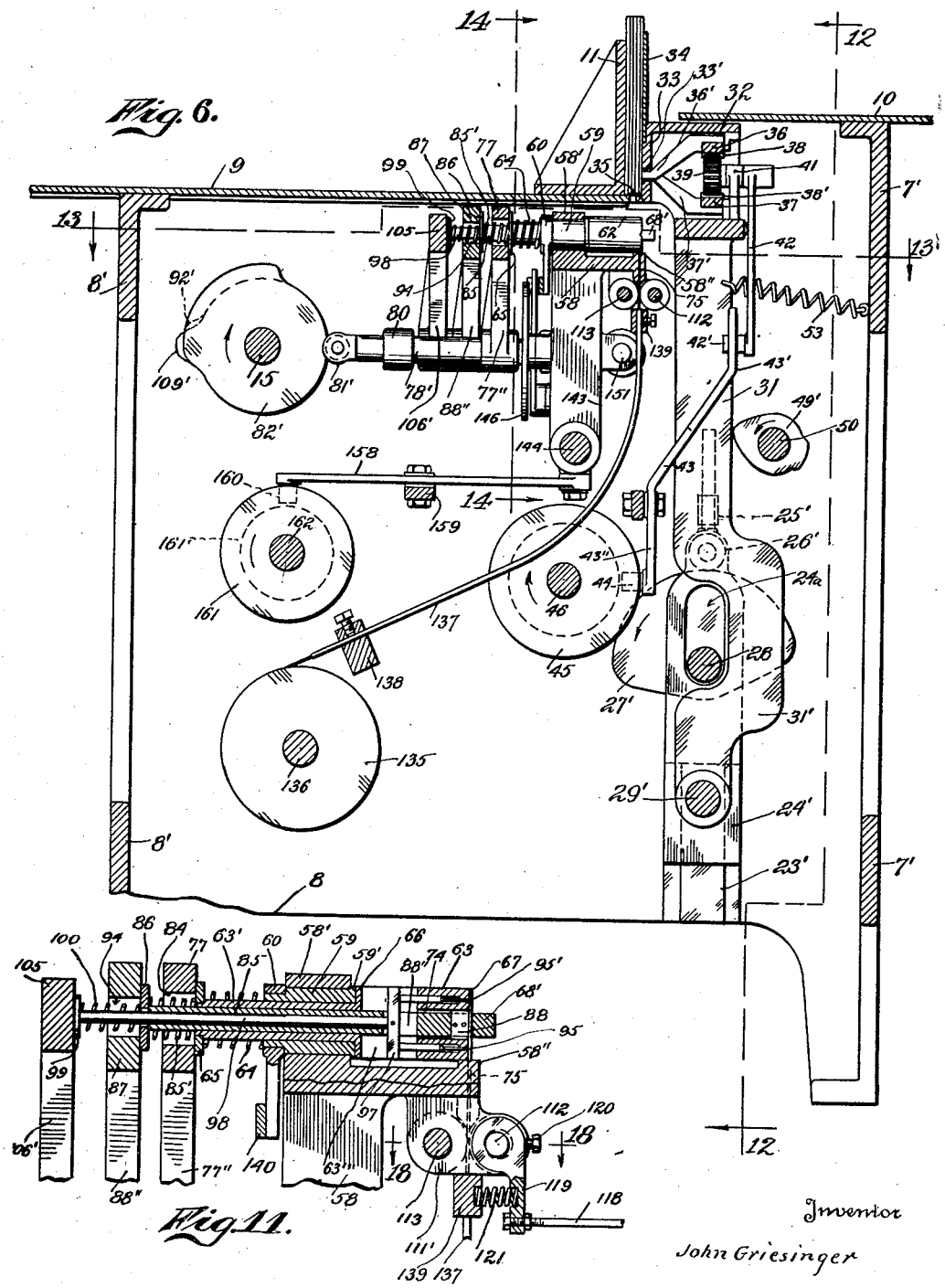
Inventor
John Griesinger
Attorney

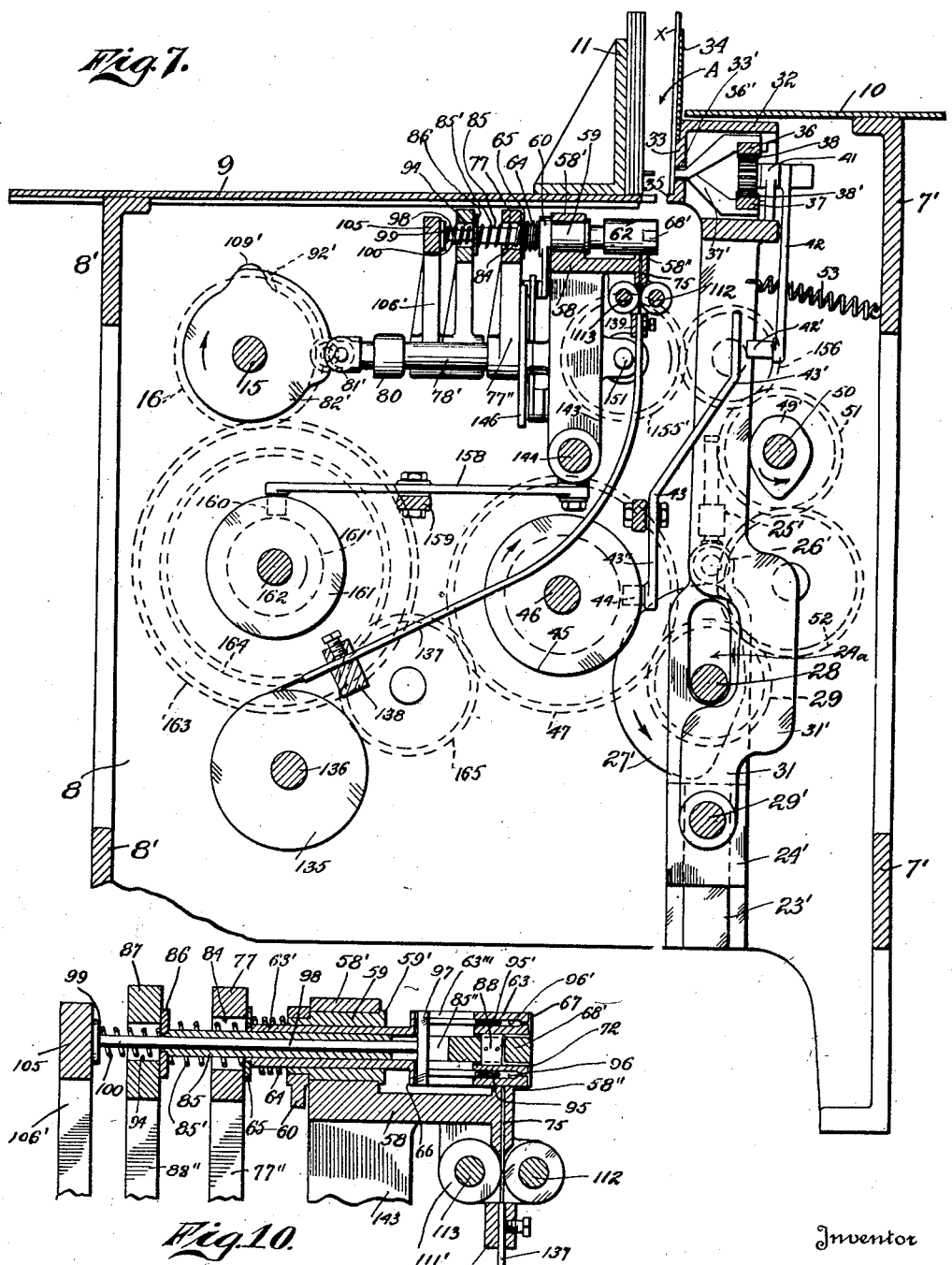

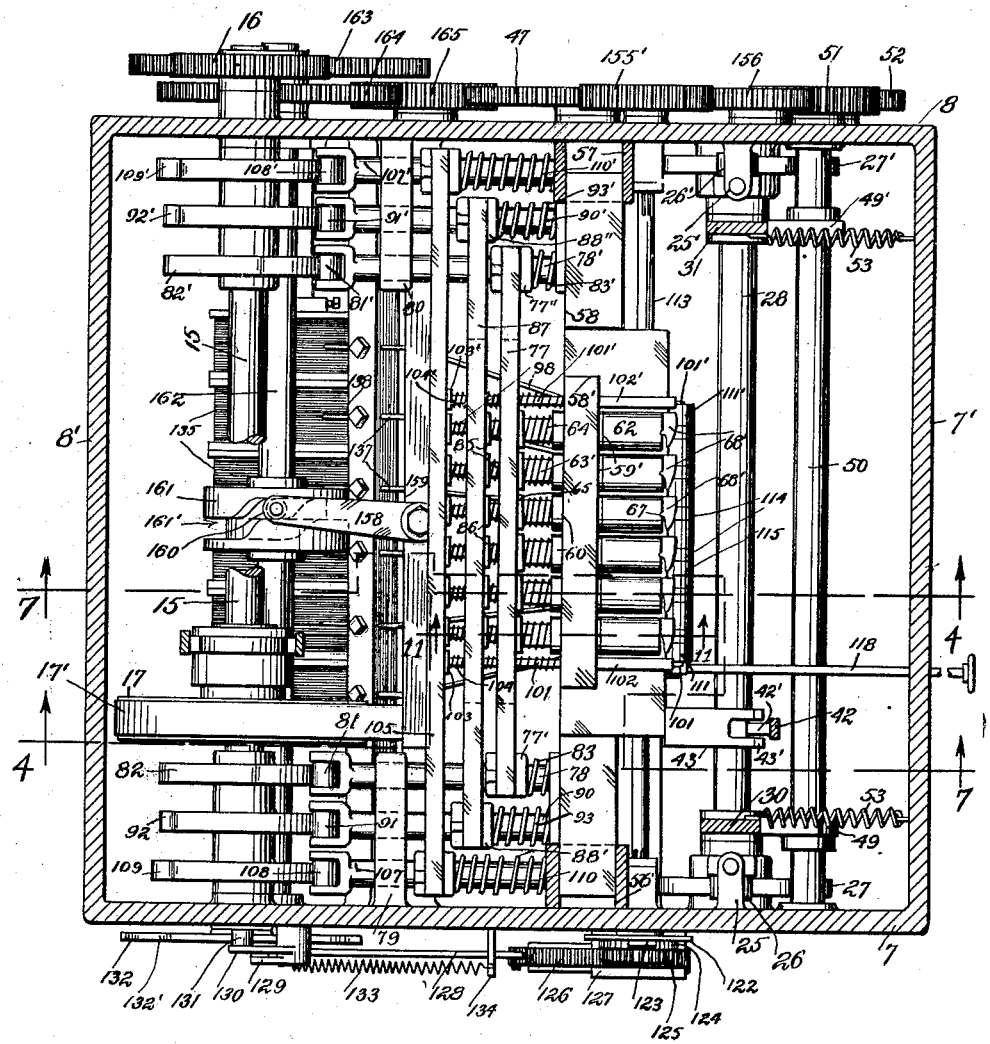

Sept. 23, 1930.  J. GRIESINGER  1,776,356
BOOKMAKING MACHINE
Filed June 29, 1929   9 Sheets-Sheet 8
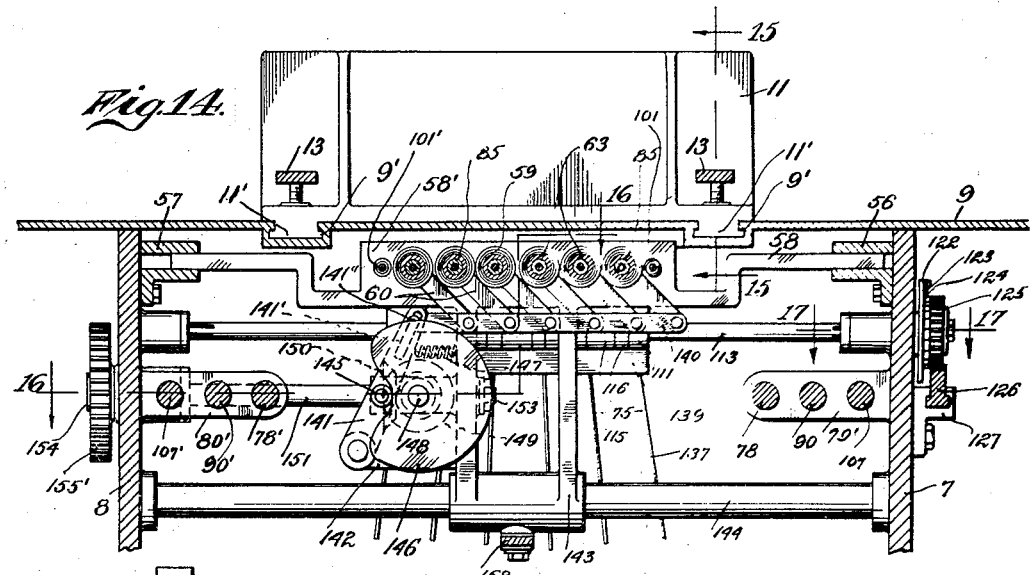
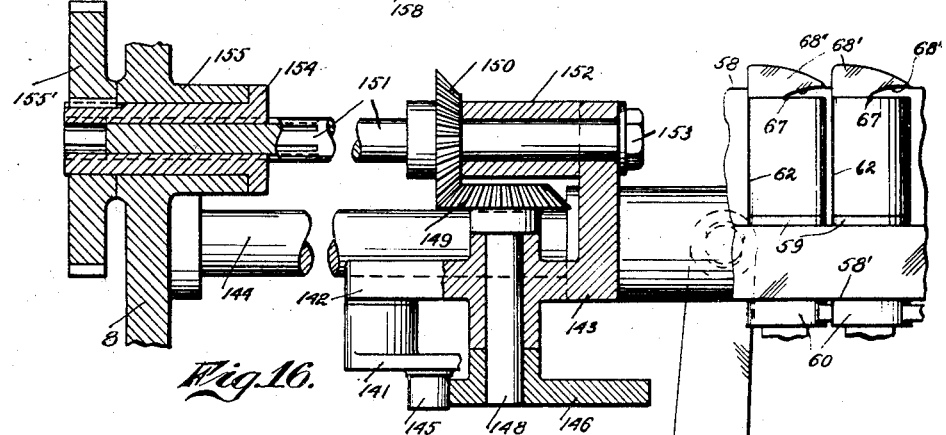
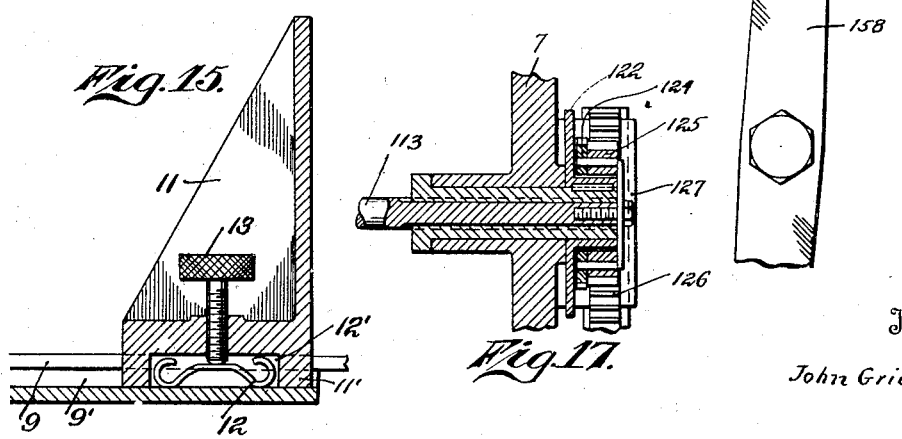
Inventor
John Griesinger
By

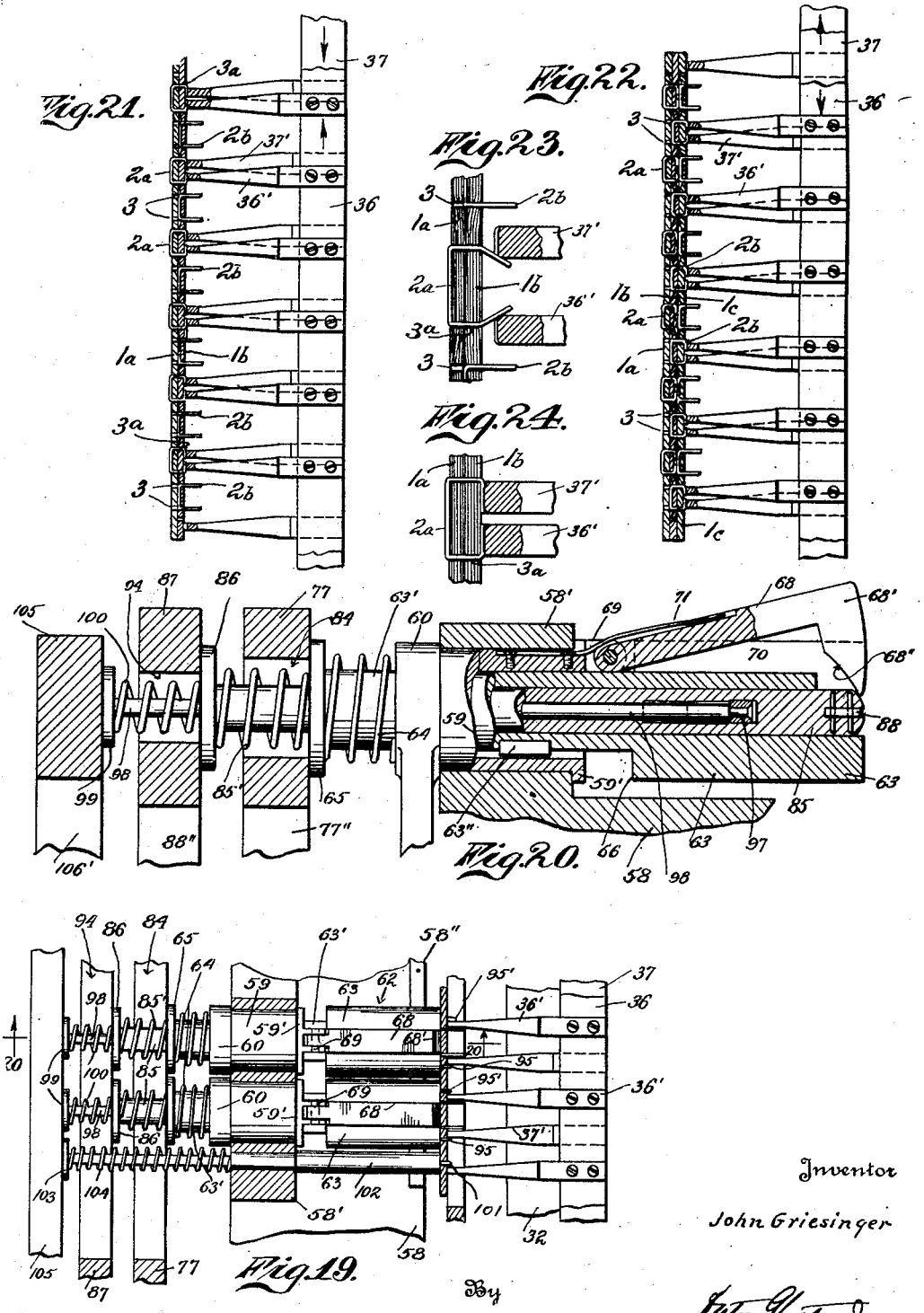

Patented Sept. 23, 1930

1,776,356

UNITED STATES PATENT OFFICE

JOHN GRIESINGER, OF LOS ANGELES, CALIFORNIA

BOOKMAKING MACHINE

Application filed June 29, 1929. Serial No. 374,760.

This invention relates to book making machines and it has especial reference to an improvement over that type and form of machine more particularly described and claimed in United States Patent #1,470,070, issued October 9, 1923 to Elmer E. Frey.

In books made by the machine disclosed in this patent, I find that the binding or conjoining means namely the staples for the respective sections, are too far apart and that the book produced thereby does not possess the desired strength, appearances and flexibility. This is owing chiefly to the method of feeding the wire to the staple forming and thrusting heads, which require that the wire be fed thereto in a curvilinear direction, and which for this purpose must be spaced sufficiently far apart to avoid bending the wire stock to a degree that would make the feeding thereof difficult, if not impossible. The design of the machine referred to makes necessary the feeding of the wire in the manner stated, and hence the staple forming and driving heads must be spaced sufficiently far apart to accommodate the wire stock without in any wise interferring with the free operation of these stapling heads.

I find also that the clinching of the staples, which in the machine mentioned are thrust through the various sections from the front, must occur practically immediately after the introduction thereof into the various sections of the book, is not satisfactory, because the staple shanks, by reason of the clinching provisions disclosed, are caused to bend in a curvilinear direction and then lie in a curve with respect to the plane of the sections. This method of clinching and the particular form which the staples assume when clinched, diminishes the strength of the bond and also detracts from the appearance of the finished book.

The essential objects of the present invention therefore are to provide a machine of this type in which the staples are placed in closer relative position; to provide a machine in which a more effective clinching of the staples is accomplished and to provide a machine which will make books comparable in point of strength, appearance and durablity with sewed books.

Various other objects and advantages will appear more fully from the description of the invention, in connection with the accompanying drawings, which form a part of this disclosure, and which illustrate a preferred form of embodiment of the invention.

In the drawings.

Fig. 4 is a section approximately on line 4—4—Fig. 13.

Fig. 5 is a section on line 5—5—Fig. 12.

Fig. 6 is a section similar to Fig. 5 but showing the parts in different position.

Fig. 7 is a sectional view on lines 7—7—Fig. 13.

Fig. 8 is a section on line 8—8—Fig. 4.

Fig. 9 is a section on line 9—9—Fig. 5.

Fig. 10 is an enlarged elevational section of the staple forming and thrusting head shown in Fig. 7.

Fig. 11 is a fragmentary section on line 11—11—Fig. 13.

Fig. 13 is a section on line 13—13—Fig. 6.

Fig. 14 is a section on line 14—14—Fig. 6.

Fig. 15 is an enlarged fragmentary section on line 15—15—Fig. 14.

Fig. 16 is an enlarged fragmentary section on line 16—16—Fig. 14.

Fig. 17 is an enlarged fragmentary section on line 17—17—Fig. 14.

Fig. 18 is an enlarged fragmentary section on line 18—18—Fig. 11.

Fig. 19 is a fragmentary sectional plan view of the staple forming and thrusting heads and of the clinching fingers.

Fig. 20 is a section on line 20—20—Fig. 19.

Fig. 21 is a plan section showing the arrangement of staples in book sections and the arrangement of the clinching bars.

Fig. 22 is a similar view as Fig. 21.

Fig. 23 is an enlarged fragmentary detail of two book sections conjoined by staples and of mechanism for clinching the staples and Fig. 24 is a similar view showing the position of the clinching means after the staple has been clinched.

Figure 1:
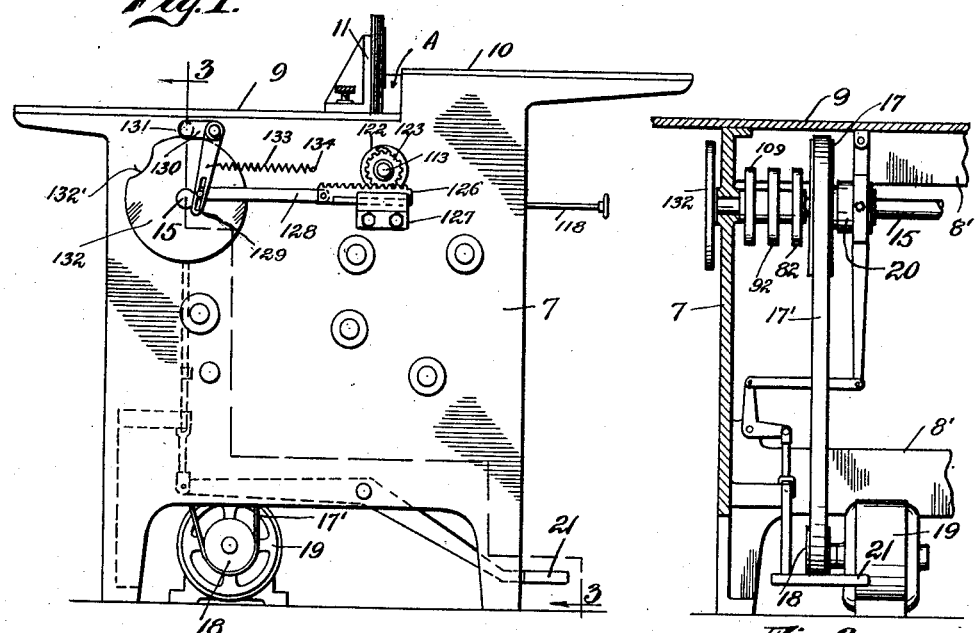
Fig. 1 is an elevation of one side of the machine.
Figures 2, 3:
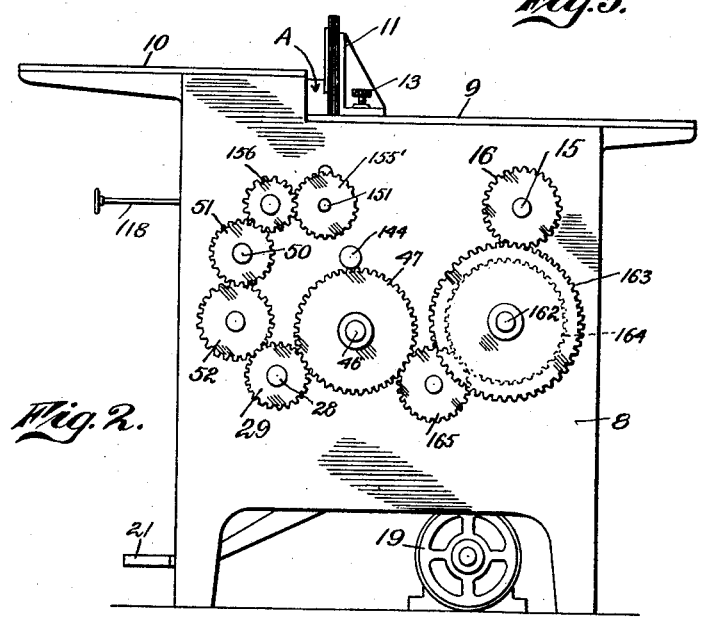
Fig. 2 is an elevation of the other side of the machine.
Fig. 3 is a sectional view on line 3—3—Fig. 1.

As in the patented machine referred to, the present machine is designed to secure each succeeding section to only the adjacent preceding section, the term section employed throughout the ensuing specification referring to and including leaves or signatures, as ordinarily understood in the art, whether used singly or in numbers in the making of a book. In the drawings, particularly in Figs. 21 to 24 inclusive, I have shown book sections, which may comprise single signatures or leaves or a plurality of such signatures or leaves, assembled and secured together at or near their binding edges.

Referring to Fig. 21, two sections or signatures $1^a$ and $1^b$ are shown in section to illustrate the relative location of the attaching staples. From that figure it will be seen that the two sections are secured together by a row of clinched staples and that one section, namely the section $1^b$ that is attached to the preceding section $1^a$ by the clinched staples is provided with a row of unclinched staples, the clinched staples alternating with the unclinched staples, so that in a finished book with all staples clinched, the staples of one row are staggered relative to those of the adjacent row, as illustrated in Fig. 22.

The manner in which each succeeding section is placed adjacent and secured to a preceding section is essentially different from that taught by the patent referred to and in order that these differences, which are of considerable importance in bringing the securing media, to wit, the staples, in close relation and in making possible a more effective clinching of the staples will be understood, I will describe the new mode without reference to the specific instrumentalities by which it is carried into effect.

Referring again to Figs. 21 to 24, inclusive, it will be noted that the staples are introduced from the rear of the sections $1^a$, $1^b$, etc., instead of from the front as in the step heretofore followed. Beginning now the section $1^a$, Fig. 21, a row $2^a$ of staples is thrust through this section. Concurrently with the introduction of this row of staples, the section is provided with a row 3 of perforations, severally consisting of pairs of holes alternating with the introduced staples and the holes of each pair spaced a distance equal to the distance between the shanks of the staples. In the first section, these holes or perforations serve no purpose. The section $1^a$ thus provided with staples, the shanks of which project through and from the section, and being parallel to each other, is then removed from the sphere of operation of the staple forming and thrusting heads, later to be detailed, and another section, say $1^b$, introduced into the sphere of operation of the heads to receive a row of staples $2^b$ and perforations $3^a$ in like manner as the preceding section $1^a$, except that the row $2^b$ of alternating staples and perforations $3^a$ in the section $1^b$ is staggered relative to the row $2^a$ and 3 of the alternating staples and perforations in the section $1^a$, and this relative staggering of the respective rows of staples is accomplished by shifting the heads laterally after each operation thereof. The section $1^b$ is now threaded upon the shanks of the staples in and projecting through the preceding section $1^a$, and these staples are then clinched while the staples carried by and projecting through the section $1^b$ remain unclinched until another section $1^c$, Fig. 22, is threaded thereupon. This method of assembling and securing the section, each to the other in manner related, is repeated throughout the making of the book. It will be observed from Fig. 23 that the clinching of the staples is effected in such wise that the projecting portions of the shanks thereof are bent at right angles to the portion thereof penetrating the sections and as shown in Fig. 24, lie flat against the face of the sections instead of in a curve as effected by the machine disclosed in the patent referred to.

The various parts of the machine of the present invention will now be described in the order in which they perform their respective functions.

*The frame*

Referring to Figs. 1, 2, 3, 7 and 12, the frame of the machine is shown to consist of side plates 7 and 8, which are conjoined at the front and rear by members 7' and 8'. The top of the frame is provided with two horizontal tables or plane surfaces 9 and 10, the table 9 being on a lower horizontal plane than and separated from the table 10 to provide a space A for the introduction of the sections as they are required in the making of a book. The table 9 is formed with a plurality of transverse grooves 9', Fig. 14, in which are disposed for movement therein the tongues 11' of a vertical thrust plate or backing 11, for the sections during the threading and clinching of the staples, as hereinafter pointed out. The thrust plate or backing 11 is arranged to resist the pressure incident to the clinching of the staples, and to yield to an increased pressure to provide the necessary space on the table 9 for supporting the next succeeding section and the book as its thickness increases. For this purpose friction means are provided and as shown in Fig. 15, such means comprises a spring 12, arranged to rest on the bottom of each of the grooves 9' in the table 9 and contained in pocket 12' in the bottom of said thrust plate 11. The tension of these springs 12 and the resultant friction produced are regulated according to need by screws 13.

In the side plates 7 and 8 is journaled a main driving shaft 15 upon which is keyed a gear 16 through which its motion is transmitted to the various mechanisms in successive order, as later pointed out. On said shaft 15 is loosely mounted a pulley 17 which is connected by a belt 17' with a pulley 18 on a motor 19, Fig. 3. All the various steps of the stapling of books are performed during one complete revolution of the shaft 15 and for this purpose, the pulley 17 is arranged to be connected to the shaft 15 by a clutch mechanism generally indicated at 20, and controlled by a pedal 21. The clutch mechanism and its control being of usual and known type, a detailed description of same is deemed unnecessary.

*The section holding, elevating and threading and clinching means*

Figure 12:
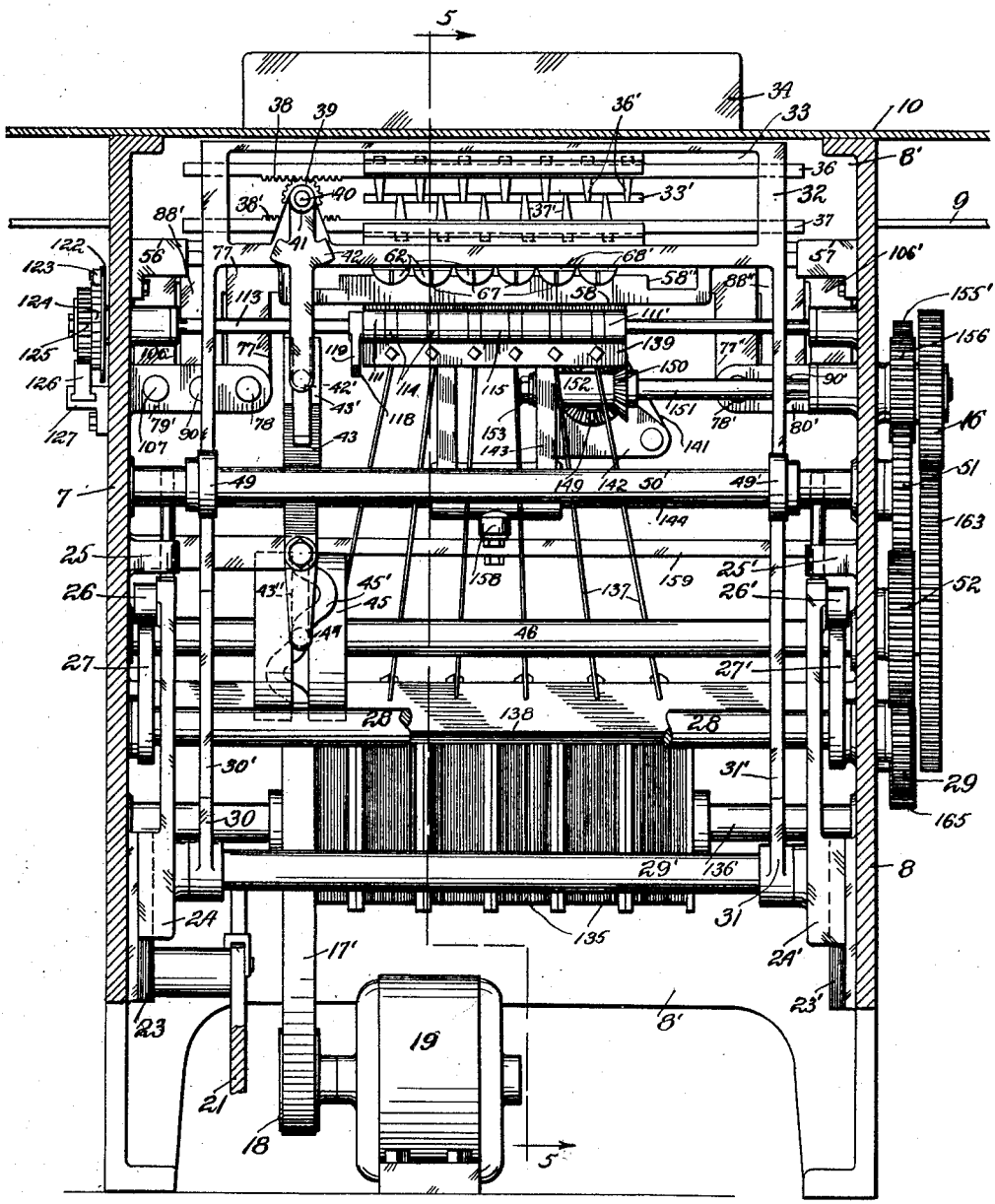
Fig. 12 is a section on line 12—12—Fig. 6.

Each of the side frames 7 and 8 is provided with vertical ways 23 and 23' respectively, Fig. 12, upon which are arranged to travel slides 24 and 24' the upper ends of which are extended through guide lugs 25 and 25' on the frame plates 7 and 8. Near the upper ends of said slides 24 and 24' are journaled laterally extending rollers 26 and 26', in engagement with which are cams 27 and 27' that are keyed to a shaft 28, journaled in the side frames 7 and 8 and on one end of which shaft is keyed or otherwise secured a gear 29, which is in mesh with other gears presently described and through which gear this shaft is rotated.

To the slides 24 and 24' is connected a cross bar 29' forming a pivot for a pair of upstanding members 30 and 31, conjoined at the top by a housing 32, which is open at the front, and the rear wall 33 of which is provided with a backing plate 34 and with a projecting ledge 35 for supporting a section, as shown in Figs. 4, 5, 6, 7 and 12. The rear wall 33 of the housing is provided with a longitudinal slot 33' into which project a plurality of series of clinching tines or fingers 36', and 37' secured to a plurality of spaced bars 36 and 37 mounted in said housing 32 for sliding movement relatively thereto. As shown in Fig. 12, the fingers 36' of the bar 36 extend between the fingers 37' of the bar 37. The finger or clinching bars 36 and 37 are arranged for relative movement in opposite directions thereby to effect the clinching of the staples by the relatively moving clinching fingers 36' and 37', and the relative movement of the bars is effected by the mechanism shown in Figs. 4, 5, 6, 7, and 12 and comprising racks 38 and 38' respectively, Fig. 12, provided on said bars 36 and 37 in engagement with which is a pinion 39 suitably fastened upon a shaft 40, that is journaled in a bearing 41, in said housing 32. To the shaft 40 mounting said pinion 39, is connected a lever 42 the end of which is provided with a stud 42' that is arranged for periodical association or temporary connection with the bifurcated end 43' of a lever 43 by which the lever 42 is operated to cause the bars 36 and 37 through the pinion 39 to move in relatively opposite directions. The lever 43 is suitably fulcrumed upon the frame of the machine and its other end 43'' is provided with a roller 44, that is disposed in a cam groove 45' of a wheel 45 mounted upon a shaft 46 which is journaled in the side plates 7 and 8 of the frame and on one end of which shaft 46 is keyed a gear 47, Figs. 7 and 13, which is in mesh with the aforenamed gear 29. The afore described housing 32 is arranged for pivotal movement on the cross bar 29' through its upstanding members 30 and 31 to accomplish several purposes, namely, to move the section X supported on the ledge 35 of the rear wall 33 of the housing into position to receive the staples, to be perforated, to thread or place the perforated section carrying the unclinched staples on the unclinched staples of a previous section, and to cause the tines or fingers 36' and 37' in said housing to clinch the staples. The movement of said housing 32 is effected by cams 49 and 49', fixed on a shaft 50, journaled in the side plates 7 and 8 of the frame and provided with a gear 51 that is in mesh with an idler gear 52 meshing with the aforenamed gear 29. These cams 49 and 49' operate against the upstanding members 30 and 31 respectively of the housing 32, contact of said members 30 and 31 with said cams 49 and 49' being insured by springs 53.

The housing 32 is also arranged for vertical movement, in one direction to elevate the section after being perforated and provided with staples and in another direction to receive a new section and support said section in position to receive staples and to be perforated. The means for elevating and lowering the housing comprise the cams 27 and 27' already referred to, and mounted on the shaft 28 which extends through vertically elongated slots 24ª, in the slides 24 and 24'. The upstanding members 30 and 31, which form a part of the housing 32 are offset as shown at 30' and 31' to accommodate the shaft 28, during the vertical movement of said members 30 and 31.

Having described in detail the structure of the housing 32 and its complements and also the instruments by which they are operated to the various positions required for co-operation with other mechanisms of the machine in the making of a book, I will now describe the sequence of movements of the housing 32.

In Fig. 4, the particular parts of the machine just referred to, namely, the housing 32 and its supporting side members 30 and 31 are shown in normal or inoperative position, preparatory to traversing their cycle of operations. It will be seen from this figure that the upstanding members 30 and 31 are held pressed against the concentric portions of the cams 49 and 49' and that in this position, they are at a slight angle to the vertical, as is also the rear wall 33 of the housing 32.

Assuming now that the machine is set in operation, the cams 49 and 49', rotating in the direction of the arrow, will move the housing 32 to the position shown in Fig. 5 and hold it in that position while the introduction of staples into the section supported on the rear wall 33 of the housing, and the perforating of the said section occurs. During the continued rotation of said cams 49 and 49', the members 30 and 31, and the housing 32 under the tension of the springs 53, will be retracted as the concentric portions of the cams 49 and 49' are engaged thereby. Immediately following the retraction of the members 30 and 31, from the stapling and perforating means later described, the said members with their associated housing 32, are elevated by the cams 27 and 27', through the agency already detailed. These cams 27 and 27' hold the members and housing in elevated position for a determinate length of time, during which the cams 49 and 49' move the members 30 and 31 and the housing 32 to the position shown in Fig. 6. This operation of the housing 32, causes the unclinched staples projecting through a prior section, as shown in Fig. 4, to pass through the perforations in the succeeding section carried on the ledge 35 of the housing 32, the prongs of the staples entering the longitudinal slot 33' in the rear wall 33 of the housing and being thereby disposed between the clinching fingers 36' and 37'. During the movement of the housing 32 while elevated, to thread a perforated section on the staples of a prior section in the manner and at the time explained, the stud 42' on the end of the lever 42, enters the bifurcation 43' in the lever 43, as shown in Fig. 6. As the lever 43 is operated by the cam 45, its motion is transmitted to the lever 42, which through its connections, rotates the pinion 39, thereby causing the clinching fingers 36' and 37' to move relatively to each other in opposite directions. By this movement of the fingers 36' and 37', the staples upon which the succeeding section is being threaded, are gradually bent upon themselves as shown in Fig. 23, the relative lateral movement of the respective fingers 36' and 37' occurring concurrently with the movement of the housing 32, by the cams 49 and 49' toward the prior section, so that after the staples are bent by the fingers, they are also pressed by them against the section as shown in Fig. 24. It will be understood that the section now clinched or secured to a prior section, is provided with staples, as shown in Fig. 5, which remain unclinched until another section is threaded thereupon and that this process of assembling and securing the sections is repeated until a book is made. As the concentric portions of the cams 49 and 49' move into position, the members 30 and 31 are again retracted by the springs 53, while still held in elevated position, as shown in Fig. 7 and thereupon the members 30 and 31, following the contours of the cams 27 and 27', gravitate to normal or original position, as shown in Fig. 4.

*The staple-forming and driving, and the perforating means*

Each of the side frame plates 7 and 8 is provided with a rectangular socket 56 and 57, Figs. 12, 13 and 14, respectively in which is supported for lateral movement a plate or carriage 58, formed preferably centrally thereof with an upstanding bearing block 58', provided with a plurality of spaced transverse bores and with a vertically perforated shearing edge 58'', through which the stocks from which the staples are to be formed are fed, as presently described. In the bores of said upstanding bearing block 58' is fitted a plurality of short cylindrical sleeves 59, having flanges 59' at one end which co-operate with levers 60 secured to the other ends of said sleeves 59 to hold same against transverse movement within the bores in the bearing block 58', during the relative movement of complementary parts now described. By means of the levers 60, the several sleeves are arranged to be moved axially and the mechanism for and purpose of this axial movement will be pointed out later.

The several stapling heads, generally indicated by the numeral 62, comprise tubular wire shearing and staple forming plungers 63, having reduced portions 63', which extend through said sleeves 59 and are splined thereto as at 63'', Fig. 20, to provide for a movement of said plungers 63 longitudinally relative to said sleeves and connect same with said sleeves for oscillation therewith. The plungers 63 are held in normally retracted position, as shown in Figs. 11 and 13, by springs 64, coiled around the reduced portions 63' thereof and disposed between said levers 60 and disks 65 formed on or secured to the ends of said reduced portions 63'. In retracted position, as seen in Fig. 11, the shoulders 66 of the plungers 63 are in engagement with the flanges 59' of the sleeves 59, which limit their retractile movement. The forward bottom edge of the plungers 63 co-operate with the shearing edge 58'' in shearing off the length of wire that is projected in its path of movement and the ends of said plungers 63 are provided with grooves 67 to receive the wire, the grooves, during the introduction of the wire thereto, being vertical, as seen in Figs. 10 and 11, and remaining vertical until the staples are formed. The formation of the wire into the staples is effected by the forward movement of the plungers 63 of the respective heads 62 in conjunction with anvils 68', formed on bars 68, that are pivotally secured in ears 69 projecting from said sleeves 59. These bars 68 are normally housed in pockets 70 provided longitudinally of the plungers, their housing in the pockets being insured by springs 71. The anvils 68' which are formed on the ends of said bars 68 are arranged to be received in recesses 72, Fig. 10, provided in the ends of said plungers 63 during the formation of the staples, and the inner faces of said anvils 68' are curved, as seen at 68'', for the purposes of causing them to be displaced out of the recesses 72 during the thrusting of the formed staples into a section, in manner and by the means presently specified. The walls of the recesses 72 are provided with grooves 74, Fig. 11, in which the shanks of the staples are received during their formation, which occurs when the plungers 63 are pressed forward relatively to the anvils 68'.

As seen in Figs. 6, 7, 11, 13 and 16, the anvils 68' extend beyond and in direct line with the recesses 72 in the plungers 63 and their positions are normally horizontal and remain so during the shearing action of the plungers 63 and the formation of the staples about the anvils. Thereupon the heads 62 being axially oscillated, as described later, the anvils 68' assume a vertical position as shown in Figs. 4, 5, 8, 9, 19 and 20. During the forward movement of said plungers 63, the wires 75, which at this time have been fed into the grooves 67 in the ends of the plungers 63, are sheared off and then the sheared off lengths of wire are bent about the anvils 68', which, with the formed staples thereon enter the recesses 72 in the ends of the plungers, the staples being guided by and lodged in the grooves 74 in the walls of the recesses, as clearly shown in Figs. 8 and 10. The movement of the various tubular plungers 63 to shear off the wires and form staples therefrom is accomplished by a horizontal bar 77, provided at the respective ends thereof with posts 77' and 77'', which are secured to transverse push rods 78 and 78' supported in suitable bearings 79 and 79' and 80 and 80' respectively provided therefor on the side frame plates 7 and 8. In the ends of said rods 78 and 78' are journaled rollers 81 and 81' respectively, which are held in constant engagement with cams 82 and 82' fixed upon the main drive shaft 15, by springs 83 and 83'; and by these cams 82 and 82' the transverse movement of said push rods 78 and 78' are positively actuated in one direction, their movement producing a forward movement of the bar 77 which, engaging the disks 65 on the ends of various plungers 63, also causes them to move forward. The bar 77 is provided with a central longitudinal slot 84, for purposes to appear presently.

Referring again to Fig. 20, the means for introducing the staples formed in the manner just related are shown as comprising thrust bars 85 which extend through the tubular plungers 63 and provided at their rear ends with disks 86, between which and the disks 65 on said plungers 63 are interposed springs 85', that are coiled about and function to maintain the thrust bars 85 normally in retracted position, as shown in Figs. 8 and 10. The rear ends of said thrust bars 85 extend freely through the elongated slot 84 provided in the bar 77, above referred to. The forward ends of said thrust bars 85, which as seen in Fig. 20, are cylindrical, are provided centrally thereof with inserts 88, the widths of which are greater than the diameters of the thrust bars 85 and the opposite projecting edges of which extend in the grooves 74, in the wall of the recesses 72 in the ends of the plungers 63. These inserts 88 travel in the grooves 74 in which are also contained the shanks of the staples, and during the forward movement of the thrust bars 85, the staples are forced into a book section, as seen in Figs. 5, 9 and 19. As seen in Fig. 8, the movement of the plungers 63 is independent of the movement of the thrust bars 85, which do not begin to operate until the formation of the staples is completed. The plungers 63 are held in the positions to which they are moved in the formation of the staples, by the cams 82 and 82', already mentioned. While the plungers 63 are so held, the thrust bars 85 are actuated, and as the staples in the ends of the plungers are thereby being forced into a section, the anvils 68' about which the staples have been shaped, are gradually displaced, so that after the introduction of the staples, the anvils 68' are entirely out of the path of movement of the thrust bars 85.

The movement of the various thrust bars 85 is accomplished by a horizontal bar 87, provided at the respective ends thereof with posts 88' and 88'', which are secured to transverse push rods 90 and 90', supported in the aforenamed bearings 79 and 79' and 80 and 80' respectively. The ends of these push rods 90 and 90' are provided with rollers 91 and 91', respectively, which bear against cams 92 and 92', secured to the shaft 15, the engagement of the rollers with the cams, being insured by springs 93 and 93'. By these cams 92 and 92', the push rods 90 and 90' and the bar 87 are positively actuated in one direction and the movement of the bar 87 is transmitted to the thrust bars 85, by engaging the disks 86 thereof. The bar 87 is provided with a longitudinal slot 94, for the purposes presently appearing.

As hereinbefore stated, each section of the book is provided with a row of staples, in the manner and by the means set out, and each section is arranged to be provided with a row of perforations, as seen in Fig. 21, the perforations alternating with the staples and being arranged to receive or be threaded on the staples of a preceding section, as previously explained. The means for perforating the sections are shown in Figs. 8, 9, 10 and 11, and comprise a pair of punches or perforators 95 and 95', operably contained in longitudinal guideways 96 and 96', which as seen in the figures referred to, are parallely disposed on the center line, and near the periphery of each of said plungers 63, whereby the punches or perforators 95' of the plungers cooperate with the punches or perforators 95 of adjacent plungers to provide equally spaced series of perforations each of which series is of a width equal to the width of the staples. The perforators or punches 95 and 95' are mounted upon crossheads 97, which are freely movable in slots 63''' provided in the plungers 63, and in slots 85'' provided in the thrust bars 85. To the crossheads 97 are connected rods 98, which extend through the thrust bars 85, and on the ends of which are secured disks 99, between which and the disks 86 on said thrust bars 85 are interposed springs 100, which function to maintain said perforator operating rods 98 in normally inoperative or retracted position. At the respective ends of the row of stapling heads 62, that is, adjacent to each end stapling head of the row, is provided an extra punch or perforator 101 and 101', which are arranged to co-operate with the perforators or punches 95 and 95' respectively in such end heads in providing the two holes necessary for staples. As seen in Figs. 8, 9, 13 and 19, these additional perforators 101 and 101' are operably contained in tubular guides 102 and 102', which are secured in the upstanding bearing block 58' on the plate 58. The ends of said perforators 101 and 101' are provided with disks 103 and 103', Fig. 13, between which and the upstanding bearing block 58' are interposed springs 104 and 104' respectively, for holding the additional perforators 101 and 101' in normally inoperative or retracted position.

The operation of the perforators or punches 95 and 95' and also of the auxiliary or supplemental perforators 101 and 101' is effected by a horizontal bar 105, provided at the respective ends thereof with posts 106 and 106', which are secured to transverse push rods 107 and 107', supported in the aforenamed bearings 79 and 79' and 80 and 80', on the frame plates 7 and 8, respectively. The ends of these push rods 107 and 107' are provided with rollers 108 and 108', respectively, which bear against cams 109 and 109', secured to the shaft 15, the engagement of the rollers with the cams being insured by springs 110 and 110'. By these cams 109 and 109' the push rods 107 and 107' and the bar 105 connected therewith are positively operated in one direction and the movement of the bar is transmitted to the perforating punches 95 and 95' and also to the auxiliary punches 101 and 101'. The forming of the staples, the introduction thereof into a book section and the perforating of section, occur in the succession in which the mechanical agencies for accomplishing these functions have been described. Obviously the feeding of the wire stock to various stapling heads 62 takes place prior to any of the movements above referred to and I will now describe the wire feeding mechanism.

The plate 58 is provided on the underside with spaced bracket members 111 and 111', Fig. 18, in which is supported a stationary bearing bar 112, and a relatively rotatable shaft 113. Upon said stationary bearing bar 112 is loosely mounted a plurality of rollers 114, spaced relatively to each other by spacing devices 115, mounted loosely upon both the bearing bar 112 and the shaft 113. On the shaft 113, and between the spacing devices 115, is keyed a plurality of rollers 116, which co-operate with the rollers 114 in frictionally engaging the wires 75 and advancing them when the shaft 113 is rotated. The keys 116', which conjoin the rollers 116 with the shaft 113 for rotation therewith, are disposed in a keyway 113' in said shaft 113, and thereby the rollers 116 are movable longitudinally on the shaft 113, with and as the plate 58 is shifted to one side and the other, as pointed out presently. At its respective ends, the bearing bar 112, which is cylindrical, is eccentric as seen at 117, and the eccentric ends 117 are carried in the respective members 111 and 111'. They are provided for the purpose of adjusting the rollers 114 on the bar 112 relatively to the rollers 116 on the shaft 113 to regulate the frictional grip of the respective rollers on the wires 75. By reason of these eccentric ends 117, the bearing bar 112, may also be moved so that the rollers 114 thereon will not co-operate with the rollers 116 to advance the wires 75, which therefore remain stationary. This feature is desirable to avoid the formation and introduction of staples into the last section of the book. The movement of the bearing bar 112 to any of the positions noted, is effected by a handle 118, Fig. 12, extending toward or beyond the machine and within convenient reach of the operator, and connected to a lever 119 that is arranged to be secured to one of the eccentric ends of the bearing bar by a set screw 120, Figs. 11, 13 and 18. Pressure of the respective rollers 112 and 116 against the wires 75 to grip and advance same, is insured by a spring 121, Fig. 11, and as just pointed out this pressure is regulable. Means for operating the shaft 113 periodically, that is, at the time required for feeding the wires 75 to the various stapling heads 62, are shown in Figs. 1, 13, 14 and 17. On the end of the shaft 113, and outside of the frame plate 7, is rigidly secured a disk 122, near the periphery of which is pivotally connected a pawl 123 which lies normally upon a ratchet wheel 124. This ratchet wheel is connected with a pinion 125 that is loosely mounted upon said shaft 113 and with which pinion 125, a rack 126, operably disposed in a slide 127, secured to the side frame plate 7, is in engagement. To the rack 126 is pivotally attached one end of a bar 128, while its other end is connected to one arm 129 of a bell crank that is pivotally mounted in the frame plate 7. The other arm 130 of said bell crank is provided with a roller 131, which is arranged to ride upon a wheel 132, rigidly secured upon the main drive shaft 15, and provided at one point in its periphery with a depression 132'. The roller 131 is maintained in contact with the wheel 132, by a spring 133, connected to the arm 129 of the bell crank, and to a pin 134 provided on the frame plate 7. When, during the revolution of said wheel 132, the roller 131 on the arm 130 of the bell crank enters the depression therein, under the influence of the spring 133, the consequent movement of the arm 129 of the bell crank is transmitted to the rack 126. Thereby the pinion 125 and its associated ratchet wheel 124 are revolved, and the movement of the ratchet wheel is communicated through the pawl 123 to the disk 122 and eventually to the shaft 113. By this movement of the shaft 113, the rollers 114 and 116, feed the wires 75, which, as seen in Figs. 4, 5, 6, 7, 10, 12 and 13, are wound upon spools 135, loosely mounted upon a shaft 136 secured in and between the frame plates 7 and 8, and which are arranged to pass through guide tubes 137, that at the bottom are secured in a horizontal block 138, provided between the plates 7 and 8, and at the top are supported in a horizontal extension 139 of said plate 58. When the roller 131 on the arm 129 of the bell crank moves out of the depression 132' in the wheel 132, the consequent movement of the ratchet wheel 124, through the connections already detailed, will be away from the pawl 123, and thereby no movement of the shaft 113 and its associated wire feeding rollers will occur.

*Oscillating means for stapling heads*

I have hereinbefore referred to the anvils 68' which are connected with the various stapling heads 62 and which are arranged to be displaced during the forward movements of the thrust bars 85 by which the staples formed over the anvils are introduced or forced through a book section. Since the various stapling heads 62 are disposed in close proximity to each other in order to bring the staples introduced thereby in close relation with respect to each other, and since these anvils 68', as seen in Figs. 6, 11, 12, 13 and 16, lie in a horizontal position during the feeding of the wire stock into the grooves 67 in the ends of the plungers, it will be apparent that the movement of the anvils 68' beyond the peripheries of the respective stapling heads and while in horizontal position, would be prevented by the adjoining heads. For this reason, and also the further reason that staples must be introduced into the sections in horizontal position, it is required that the heads 62 be turned after the shearing of the wire and the formation of the staples over the anvils 68', that they be held in such turned position during the operation of the thrust bars 85 and the perforators 95, 95', 101 and 101' and that they then be returned to normal position, as shown in Fig. 11. This movement of the heads 62, therefore is an axial one and is accomplished by the oscillation of the levers 60 which, as heretofore described, are fixedly secured to the sleeves 59. The ends of said levers 60 are pivotally secured to a bar 140 and the movement of said bar 140 to produce oscillation of said levers 60 and therefore the heads 62 is effected by a lever 141 having in one end an elongated slot 141' in which extends a headed stud 141" provided on one end of the horizontal bar 140. The other end of said lever 141 is pivotally connected to an extension 142 of a yoke 143 which constitutes a part of the plate or carriage 58 and is mounted for sliding movement upon a cross shaft 144, for purposes appearing presently. Intermediate its ends, the lever 141 is provided with a roller 145 which is arranged to be held in engagement with a cam 146, by a spring 147, Fig. 14, connected to the upper end of the lever 141 and to the yoke 143. The cam 146 is fastened upon a shaft 148, which is journaled in said extension 142, and on the end of said shaft 148 is a bevel gear 149. In mesh with the bevel gear 149 is a bevel gear 150 fastened on a shaft 151 which at one end is journaled in an extension 152 of the yoke 143, and held therein against longitudinal movement by a nut 153. The other end of said shaft 151 is splined to a flanged bushing 154 rotatably mounted in a bearing 155 in the frame plate 8 and relatively to which the shaft 151 may move longitudinally. On the end of said bushing 154 is keyed a spur gear 155', which meshes with an idler gear 156, Figs. 2 and 7, journaled on the outside of the frame plate 8, and which idler gear in turn is in mesh with the aforenamed gear 51.

From the above it will be observed that the mechanism detailed constitutes an integral part of the yoke 143, which, with its complements including the mechanism specified, is shiftable on the shaft 144, and that the operation of the cam 146, to turn the stapling heads 62, is an independent one; it will also be observed that the shaft 151 is movable in and relatively to the bushing 154, during the shifting of the yoke 143 and its associated parts. Referring now to Figs. 14 and 6, the position of the heads 62 is normal, that is, the grooves 67 in the ends of the plungers 63 are in vertical position to receive the wire stock, and the anvils 68' are in horizontal position. After the stock has been sheared and the staples formed in the heads 62, as before explained, the heads are turned a quarter of a revolution in one direction by the cam 146 as seen in Figs. 8 and 9. The heads 62 are then held in such turned position by said cam 146 until the operations of thrusting the staples into and perforating a section have been completed, whereupon under the tension of the spring 147 the heads are turned a quarter of a revolution in the opposite direction which again places the grooves 67 in the ends of the plungers 63 in normal or vertical position as seen in Fig. 11.

*Shifting mechanism for the plate 58 and its complementary parts*

As heretofore explained, the staples and perforations provided in one section are arranged to be staggered with relation to the staples and perforations in the adjacent section and for this purpose the staple-forming, thrusting and perforating heads 62 are shiftable with respect to each succeeding section after each operation, in manner and by the means now described.

To the bottom of the yoke 143, which as stated is mounted upon the shaft 144, is pivotally secured one end of a lever 158, that is fulcrumed upon a cross member 159. The other end of said lever 158 is provided with a roller 160, which is disposed in the cam groove 161' of a wheel 161, keyed or otherwise secured to a shaft 162. Motion to the shaft 162 is imparted through a gear 163, keyed on the end of said shaft 162 and in mesh with the main gear 16 on the shaft 15. On said shaft 162 is also keyed a gear 164, which meshes with an idler gear 165 that in turn meshes with the aforenamed gear 47. In this wise, all of the gears heretofore described and designated by the numerals 163, 164, 165, 47, 29, 52, 51, 156 and 155 are driven by the master gear 16. By means of the cam wheel 161 and its complementary lever 158 the plate or carriage 58 is shifted alternately from one position to another with intervening periods of time during which the various heads 62 are turned to receive the wire stock, the wire stock is fed into the grooves 67 in the ends of the plungers 63 and the successive operations of forming the staples, turning the heads and introducing the staples into and perforating the sections, take place as already related. While the shifting of the heads 62 is occurring, the section that previously has been provided with staples and perforations is elevated and threaded upon the staples of a preceding section and simultaneously the clinching of the staples carried by the preceding section and extending through the perforations of the succeeding section, is effected in manner and in the sequence set forth in the connection with the description following of the operation of the machine.

In the position of the housing 32, shown in Fig. 4, a new section is placed upon the ledge 35. As the machine is now set in operation, the wire stock 75 is fed into the grooves 67 in the ends of the plungers 63, which are moved forward to shear off the length required for and to form the staples. The various stapling heads 62 are now turned from the position shown in Fig. 6 to the position shown in Fig. 4. By means of the cams 49 and 49' the housing 32 with the section thereon, is now moved into engagement with the heads 62. The staples contained in the heads 62 are now thrust into the section and the perforators 95 and 95' are actuated to pierce the sections. The housing 32, with the perforated and unclinched staples is then moved away from the heads 62 which are then turned back to normal position, as shown in Fig. 6, and elevated by the cams 27 and 27' to the position shown in Fig. 6. After the elevation of the housing 32 with the section carried thereby, the cams 49 and 49' move the housing rearwardly and in so doing cause the projecting staples of a preceding section to pass through the perforations in the succeeding section, which is the section carried on the ledge of the housing 32, the staples entering the longitudinal groove 33' in the rear wall 33 of the housing and extending between the respective clinching fingers 36' and 37'. Practically simultaneously with the threading of this perforated section on the staples of the preceding section, these staples are clinched by the relative movement in one direction of the fingers 36' and 37', which due to the rearward motion of the housing concurrently with this relative movement of the fingers, exert pressure upon the shanks of the staples and press them firmly against the section. The housing is now moved away from the section as shown in Fig. 7, and lowered to the position shown in Fig. 4, in which position a new section is supplied. Thereupon the heads 62 are shifted for the purpose heretofore specified and the machine then comes to rest, preparatory to repeating the sequence of operations just recited.

What I claim, is:

1. In a machine of the character disclosed, means for introducing staples into and perforating a book section, and means for threading said section upon the staples of a preceding section and simultaneously clinching the staples in the preceding section upon the succeeding section.

2. In a machine of the character disclosed, means for successively providing book sections with staples and perforations, and means for successively threading the perforated sections on staples of other sections and simultaneously clinching the staples upon the sections through which they extend.

3. In a machine of the character disclosed, means for successively providing book sections with alternating staples and perforations, and means for threading the sections successively upon and simultaneously clinching the staples of preceding sections.

4. In a machine of the character described, means for successively providing book sections with staples and perforations alternating with each other, and means for successively threading said sections on the staples of other sections and simultaneously clinching the staples of such other sections.

5. In a machine of the class disclosed, means for successively providing book sections with staples and perforations alternating with each other, means for threading each section on the staples of a preceding section, and means for clinching the staples of each preceding section to conjoin each section successively only to each preceding section.

6. In a machine of the character described, a book section support, means successively to provide sections carried by said support with staples and perforations alternating with each other, means for operating said support to thread the stapled and perforated sections successively on the staples of a preceding section, and means carried by said support to clinch the staples of each preceding section thereby to fasten each succeeding section only to the preceding section.

7. In a machine of the character described, a book section support, a staple-providing means and a perforating means, means to move said support to cause a section thereon to receive staples and perforations from said staple-providing and perforating means, means to operate said support to thread the perforated and stapled section upon a preceding section, and means carried by said support and simultaneously operable during the threading of a section to clinch the staples of a preceding section and thereby fasten the succeeding section to the preceding section.

8. In a machine of the character described, means for successively providing staples in book sections, means for causing the staples of a preceding section to penetrate a succeeding section, and means for simultaneously clinching the staples of such preceding section to conjoin the succeeding section only to the preceding section.

9. In a machine of the character described, means for providing successive book sections with staggered staples, and means for pressing succeeding sections upon the staples of preceding sections.

In testimony whereof I have set my hand.
JOHN GRIESINGER.